April 30, 1935.  A. M. RICHARDSON  1,999,916
PITMAN BOX
Filed Sept. 19, 1934    2 Sheets-Sheet 1

Inventor

A. M. Richardson

By Clarence A. O'Brien
Attorney

April 30, 1935.  A. M. RICHARDSON  1,999,916
PITMAN BOX
Filed Sept. 19, 1934  2 Sheets-Sheet 2
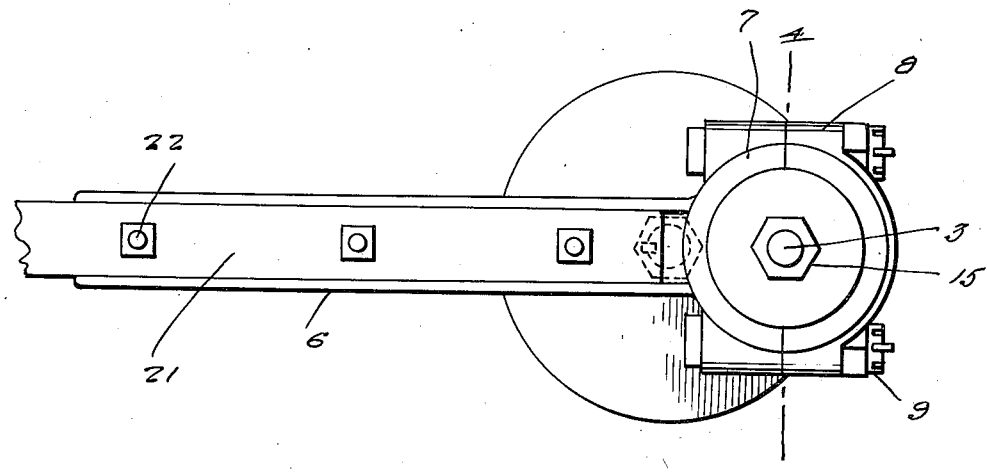
Fig. 2.
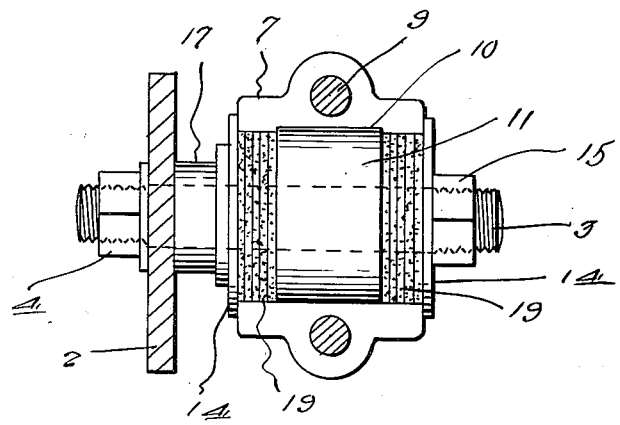
Fig. 4.
Fig. 5.  Fig. 6.
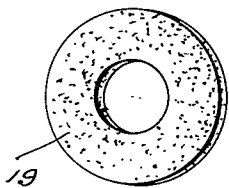
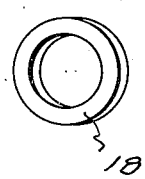
Inventor
A. M. Richardson
By Clarence A O'Brien
Attorney Patented Apr. 30, 1935

1,999,916

UNITED STATES PATENT OFFICE 1,999,916

PITMAN BOX

Arthur M. Richardson, Colfax, Wash.

Application September 19, 1934, Serial No. 744,729

2 Claims. (Cl. 308—179)

This invention relates to a box or bearing for a pitman, the general object of the invention being to provide means for reducing friction between the pin and the pitman bearing to a minimum, thus avoiding frequent replacement of the pin and also providing means whereby all of the parts can be readily lubricated and to make the device dust-proof.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 2 is a front view of the invention.

Figure 4 is a section on line 4—4 of Figure 2.

Figure 5 is a view of one of the fibre washers.

Figure 6 is a view of one of the metal washers.

Figure 1:
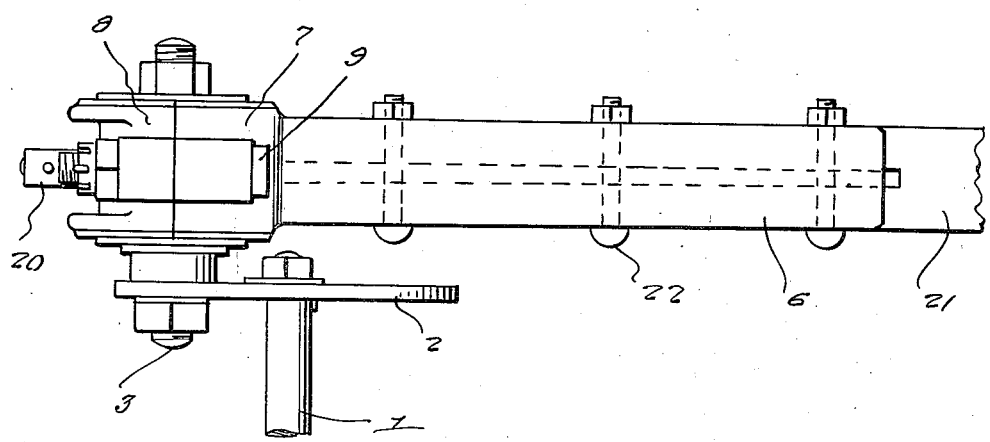
Figure 1 is a top plan view showing a pitman and the drive means for the same in plan view.
Figure 3:
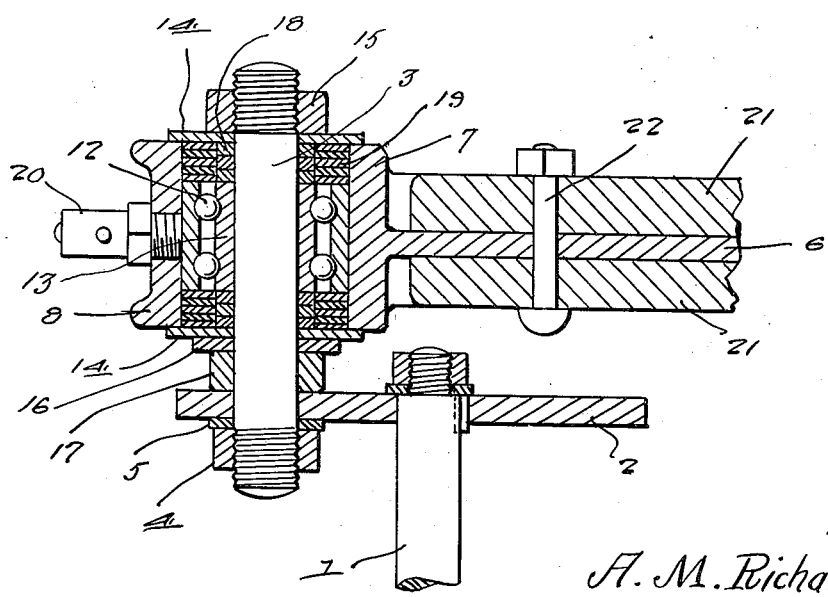
Figure 3 is a longitudinal sectional view thereof.

In these drawings, the numeral 1 indicates the drive shaft of a mowing machine or the like and the numeral 2 indicates the disk fastened to the shaft and having an eccentric hole therein for receiving the pin 3, said pin having its ends threaded, the end which passes through the disk having a nut 4 and a washer 5 thereon. An I-member 6 has a semi-circular bearing 7 formed on one end thereof and a semi-circular cap 8 is fastened to this part 7 by the bolts and nuts shown generally at 9. These parts 7 and 8 form a circular bearing and are slightly recessed, as shown at 10 in Figure 4, to receive portion of the outer ring race 11 which is internally grooved to receive the annular rows of balls 12. The inner race 13 encircles the pin 3 and is exteriorly grooved for receiving portions of the balls 12. A circular plate 14 closes each end of the bearing or box and each plate has a hole therein through which the pin passes and a nut 15, threaded on the outer end of the pin, holds the parts together with the inner plate 14 bearing against a washer 16 and a sleeve 17 is placed between the washer and the disk. A plurality of rings 18 of metal and one of which is shown in Figure 6, is placed at each end of the inner race 13, these rings 18 being of the same exterior diameter as said inner race and fill the space between the ends of said inner race and the plates 14. Fibre washers 19, one of which is shown in Figure 5, surround the ring-shaped washers 18 and bear against the ends of the outer race 11 and against the plates 14. Any form of lubricant fitting 20 is threaded in the cap so that lubricant can be supplied to the parts and this lubricant is retained in the device by means of the washers 19 and the parts are so arranged that the device is practically dust-proof and there is practically no wear on the pin, so that this pin will last a long time. The knife bar or other part to be reciprocated has one end forked to fit into the channels formed by the I-member 6, as shown at 21 and these parts are bolted together, as shown at 22.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. In combination with a reciprocatory member and a member carrying a crank pin for imparting motion thereto, a semi-circular bearing member formed on one end of the reciprocatory member, a semi-circular cap bolted to the bearing member and forming a circular box through which the pin passes, an outer race located in the box, an inner race located in the box and encircling the pin, anti-friction bearings between the races, said races having their ends terminating inwardly of the ends of the box, closure means for the ends of the box, a plurality of metallic washers of the same diameter as the diameter of the inner race disposed on the pin between the closure means and the race members, a plurality of fibre washers between the outer race and the closure means and surrounding the metallic washer, and means for introducing lubricant into the box.

2. In combination with a reciprocatory member and a member carrying a crank pin for imparting motion thereto, a semi-circular bearing member formed on one end of the reciprocatory member, a semi-circular cap bolted to the bearing member and forming a circular box through which the pin passes, an outer race located in the box, an inner race located in the box and encircling the pin, anti-friction bearings between the races, said races having their ends terminating inwardly of the ends of the box, closure means for the ends of the box, washers located between the closure means and the race members, means for introducing lubricant into the box, said washers including ring-shaped metal parts encircling the pin and fibre parts encircling the metal parts.

ARTHUR M. RICHARDSON.